US008536803B2

(12) United States Patent
Sadwick et al.

(10) Patent No.: US 8,536,803 B2
(45) Date of Patent: Sep. 17, 2013

(54) FLUORESCENT LAMP POWER SUPPLY

(75) Inventors: Laurence P. Sadwick, Salt Lake City, UT (US); William B. Sackett, Sandy, UT (US)

(73) Assignee: InnoSys, Inc, Salt Lake City, UT (US)

( * ) Notice: Subject to any disclaimer, the term of this patent is extended or adjusted under 35 U.S.C. 154(b) by 216 days.

(21) Appl. No.: 12/837,460

(22) Filed: Jul. 15, 2010

(65) Prior Publication Data

US 2011/0169426 A1 Jul. 14, 2011

Related U.S. Application Data

(60) Provisional application No. 61/226,193, filed on Jul. 16, 2009.

(51) Int. Cl.
*H05B 37/02* (2006.01)
*H02M 1/12* (2006.01)

(52) U.S. Cl.
USPC .......... 315/307; 315/209 R; 315/308; 363/49; 363/21.1; 363/97

(58) Field of Classification Search
USPC ............... 363/21.09, 21.13, 21.17, 21.18, 17, 363/97, 98; 315/307, 149, 247, 291
See application file for complete search history.

(56) References Cited

U.S. PATENT DOCUMENTS 5,453,921 A * 9/1995 Shutts ........................ 363/21.18
5,463,280 A 10/1995 Johnson
5,539,281 A * 7/1996 Shackle et al. ................ 315/224
5,581,158 A * 12/1996 Quazi ........................... 315/149
5,734,564 A * 3/1998 Brkovic ..................... 363/21.16
5,812,383 A * 9/1998 Majid et al. ................ 363/21.05
6,081,075 A 6/2000 Littlefield
6,215,290 B1 * 4/2001 Yang et al. .................... 323/282
6,252,783 B1 * 6/2001 Huh et al. .................. 363/21.01
6,295,217 B1 * 9/2001 Yang et al. ...................... 363/49
6,462,485 B1 10/2002 Kimball
6,577,512 B2 6/2003 Tripathi et al.
6,927,989 B2 8/2005 Fukumoto
6,965,205 B2 11/2005 Piepgras et al.
7,019,995 B2 * 3/2006 Niemand et al. ................ 363/97
7,151,246 B2 12/2006 Fein et al.
7,151,345 B2 12/2006 Sanchez
7,161,313 B2 1/2007 Piepgras et al.
7,178,941 B2 2/2007 Roberge et al.
7,183,724 B2 2/2007 Ball
7,202,613 B2 4/2007 Morgan et al.
7,227,763 B1 * 6/2007 Noh et al. .................. 363/56.02
7,233,115 B2 6/2007 Lys
7,256,554 B2 8/2007 Lys
7,262,559 B2 8/2007 Tripathi et al.
7,276,861 B1 10/2007 Shteynberg (Continued)

*Primary Examiner* — Vibol Tan
(74) *Attorney, Agent, or Firm* — Hamilton, DeSanctis & Cha LLP

(57) ABSTRACT

Various embodiments of a fluorescent lamp power supply are disclosed herein. In one embodiment, a power supply includes a power input connected to a pulse generator. The power supply also includes a filter connected to a variable pulse width output on the pulse generator and to the power input. The filter is adapted to substantially block at least one harmonic frequency component of the variable pulse width output and to substantially pass a fundamental frequency component of the variable pulse width output. The power supply also includes a power output connected to the filter, wherein an amplitude at the power output is related to the pulse width at the variable pulse width output.

19 Claims, 12 Drawing Sheets

(56) References Cited

U.S. PATENT DOCUMENTS

| | | | | |
|---|---|---|---|---|
| 7,298,095 | B2 | 11/2007 | Nukisato et al. | |
| 7,358,706 | B2 * | 4/2008 | Lys | 323/222 |
| 7,378,805 | B2 | 5/2008 | Oh et al. | |
| 7,394,209 | B2 * | 7/2008 | Lin et al. | 315/247 |
| 7,449,844 | B2 * | 11/2008 | Lev et al. | 315/291 |
| 7,459,864 | B2 | 12/2008 | Lys | |
| 7,511,437 | B2 | 3/2009 | Lys et al. | |
| 7,515,446 | B2 * | 4/2009 | Lin | 363/98 |
| 7,548,437 | B2 * | 6/2009 | Choi et al. | 363/21.09 |
| 7,881,084 | B2 * | 2/2011 | Lin | 363/98 |
| 7,957,162 | B2 * | 6/2011 | Choi et al. | 363/21.13 |
| 8,027,732 | B2 * | 9/2011 | Griffith | 607/57 |
| 8,115,421 | B2 * | 2/2012 | Mishima et al. | 315/307 |
| 2005/0174818 | A1 * | 8/2005 | Lin et al. | 363/98 |
| 2006/0170373 | A1 | 8/2006 | Yang | |
| 2006/0184213 | A1 * | 8/2006 | Griffith | 607/60 |
| 2007/0008744 | A1 * | 1/2007 | Heo et al. | 363/17 |
| 2007/0114986 | A1 * | 5/2007 | Yoshii | 323/288 |
| 2008/0067953 | A1 | 3/2008 | Kranz | |
| 2008/0081423 | A1 | 4/2008 | Sadwick et al. | |
| 2008/0284346 | A1 | 11/2008 | Lee | |

* cited by examiner

FLUORESCENT LAMP POWER SUPPLY

CROSS REFERENCE TO RELATED APPLICATIONS

The present application claims priority to U.S. Patent Application No. 61/226,193 entitled “Cold Cathode Fluorescent Lamp Power Supply”, filed Jul. 16, 2009, the entirety of which is incorporated herein by reference for all purposes.

BACKGROUND

Fluorescent lamps are used in a variety of applications, such as for general purpose lighting in commercial and residential locations, in backlights for liquid crystal displays in computers and televisions, etc. Fluorescent lamps generally include a glass tube, circle, spiral or other shaped bulb containing a gas at low pressure, such as argon, xenon, neon, or krypton, along with low pressure mercury vapor. A fluorescent coating is deposited on the inside of the lamp. As an electrical current is passed through the lamp, mercury atoms are excited and photons are released, most having frequencies in the ultraviolet spectrum. These photons are absorbed by the fluorescent coating, causing it to emit light at visible frequencies.

A number of different types of fluorescent lamps exist, such as cold cathode fluorescent lamps (CCFLs) and compact fluorescent lamps (CFLs), traditional full size fluorescent lamps, etc. In general, the various types of fluorescent lamps share a requirement for a high voltage current-limited AC power supply. A very high voltage is initially applied to strike or light the lamp. Once the lamp is lit, the electrical resistance in the lamp drops and the voltage is reduced to avoid high currents. As current passes through the fluorescent lamp, the electrical resistance of the lamp drops, allowing more current to flow. Traditionally, relatively expensive and bulky ballasts are used to limit the current through the fluorescent lamp, as well as to provide the voltage needed to strike the lamp. However, traditional fluorescent lamp ballasts, in addition to being relatively expensive and bulky, can be noisy and prone to failure, and are not dimmable using TRIAC-based dimmers. Often, for low power and self ballasting applications including CFLs, traditional ballasts have electrical characteristics that are undesirable including low power factor values and performance.

SUMMARY

The present invention provides a fluorescent lamp power supply that may be used to dimmably power any of a number of types of fluorescent lamps and also maintain a high power factor.

In one embodiment, a power supply for a fluorescent lamp includes a power input connected to a pulse generator. The power supply also includes a filter connected to a variable pulse width output on the pulse generator and to the power input. The filter is adapted to substantially block at least one harmonic frequency component of the variable pulse width output and to substantially pass a fundamental frequency component of the variable pulse width output. The power supply also includes a power output connected to the filter, wherein an amplitude at the power output is related to the pulse width at the variable pulse width output.

An embodiment of the power supply also includes a dimming sense and control circuit connected to the pulse generator. The dimming sense and control circuit is adapted to controllably alter the pulse width at the variable pulse width output.

An embodiment of the power supply also includes a load current controller connected to the dimming sense and control circuit and to the power output.

In an embodiment of the power supply, the power supply is adapted to increase a power factor by controlling the pulse generator.

In an embodiment of the power supply, the filter comprises a transformer connected between the power input and the power output.

An embodiment of the power supply also includes a load current detector connected to the power output, and a load current feedback signal from the load current detector to the variable pulse generator.

An embodiment of the power supply also includes a reference current signal and a comparator connected to the load current feedback signal and the reference current signal. An embodiment of the power supply also includes an isolator connected in series with the load current feedback signal.

An embodiment of the power supply also includes a rectifier connected between the power output and the load current detector.

An embodiment of the power supply also includes a partial rectifier connected between the power output and the load current detector.

An embodiment of the power supply also includes a load voltage detector connected to the power output, and a load voltage feedback signal from the load voltage detector to the variable pulse generator.

An embodiment of the power supply also includes a rectifier connected between the power input and the filter.

An embodiment of the power supply also includes an input current detector connected in series with the filter.

An embodiment of the power supply also includes an input voltage detector connected to the power input.

In an embodiment of the power supply, the filter comprises a transformer, wherein the pulse generator comprises a transformer driver connected to the transformer.

In an embodiment of the power supply, the power input to the pulse generator comprises an unrectified alternating current supply, and the pulse generator comprises a pair of transistors controlled by a gate drive circuit.

Other embodiments provide a method of supplying power. In one such embodiment, the method includes providing a pulse train from a power input, filtering the pulse train to substantially block at least one harmonic frequency component of the pulse train while substantially passing a fundamental frequency component of the pulse train, and providing the resulting filtered waveform at a power output. The amplitude of the filtered waveform is related to a pulse width in the pulse train.

An embodiment of the method also includes adjusting the pulse width in the pulse train to control the amplitude for dimming.

An embodiment of the method also includes controlling the pulse train to increase power factor.

An embodiment of the method also includes limiting the pulse width based in part on at least one of a load current feedback signal, a load voltage feedback signal, and an input current feedback signal.

This summary provides only a general outline of some particular embodiments. Many other objects, features, advantages and other embodiments will become more fully apparent from the following detailed description. Nothing in this document should be viewed as or considered to be limiting in any way or form.

BRIEF DESCRIPTION OF THE DRAWINGS

A further understanding of the various exemplary embodiments may be realized by reference to the figures which are described in remaining portions of the specification. In the figures, like reference numerals may be used throughout several drawings to refer to similar components.

DESCRIPTION

Figure 1A:
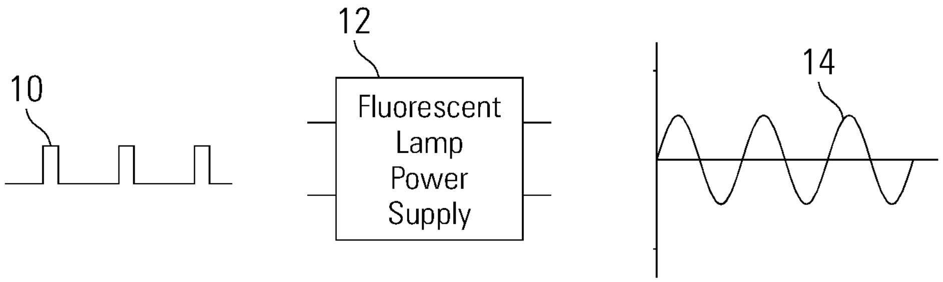
FIGS. 1A-1D depict input and output waveforms from example embodiments of a fluorescent lamp power supply.

Brief definitions of terms used throughout this document are given below. The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

A power supply is disclosed herein that may be used to power fluorescent lamps such as CFLs and CCFLs and other types of loads. High frequency pulses are generated from a typical AC line voltage and filtered in a transformer or other device to produce a high frequency AC sine wave output to drive a CCFL or other load while also having high power factor correction (PFC) and power factor. The filtered signal may be further processed if desired, for example to rectify the signal to the load. Some embodiments of the power supply may be dimmed with conventional external dimmers such as TRIAC-based dimmers and/or with internal dimming circuitry including, but not limited to, remote control via wired or wireless, digital to analog conversion, etc.

A pulse train is formed from an input power source, and the pulse train is filtered using, for example, a transformer and/or inductor, filter or other device to substantially limit the output to the fundamental frequency and block harmonics. For example, the pulse train could be a square wave at 50% on/50% off, although the pulse train is not limited to this waveform or duty cycle. By filtering the pulse train, it is transformed to a sine wave for which the amplitude is dependent on the pulse duration or width. For pulses that are on less than 50% of the period, the amplitude of the output fundamental sine wave increases in amplitude with an increase in pulse width with the amplitude of the sine wave reaching a maximum at 50% on/50% off. Above 50% on-time, the amplitude of the output sine wave decreases. By generating the pulse in an appropriate range of frequencies, such as 100 kHz (which is only an example frequency, with higher and lower frequencies also working depending on the characteristics of the transformer/filter and load requirements), high power factor and efficiency can be achieved with a substantially pure sine wave output that supports dimming, both internal and external. Universal voltage output can also be realized. The output can be isolated in embodiments using a transformer to process the pulse train. By using a rectifier or rectifier bridge, a DC rectified sine wave output can be obtained. By employing appropriate filters, other waveforms can be obtained at the output of, for example, the transformer from the input pulse Fourier series waveform and terms. In addition, for a number of applications, where appropriate, the pulse can be riding on a waveform or waveforms (for example, the pulse train could be riding on top of a 50 or 60 Hz AC sine wave).

Figure 1B:
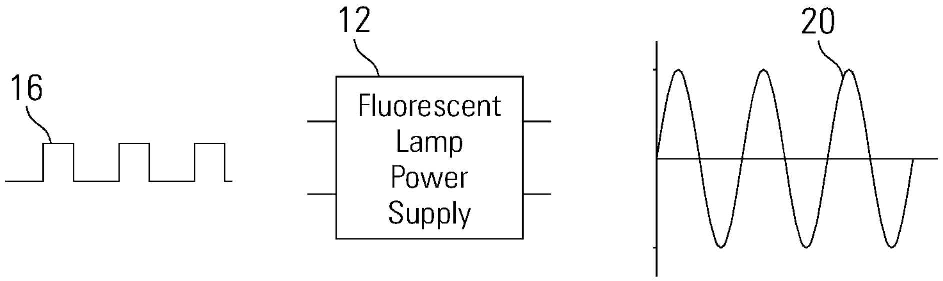
Figure 1C:
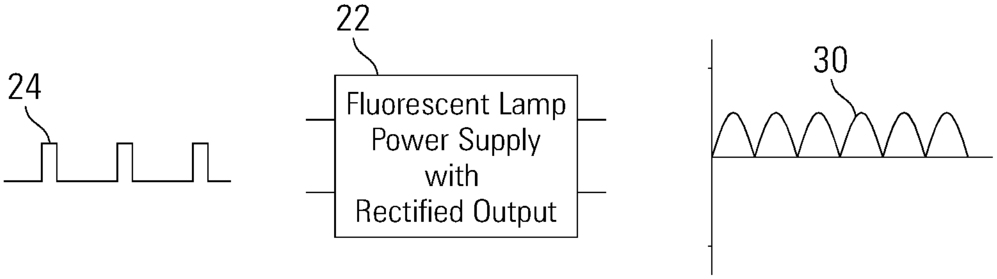
Figure 1D:
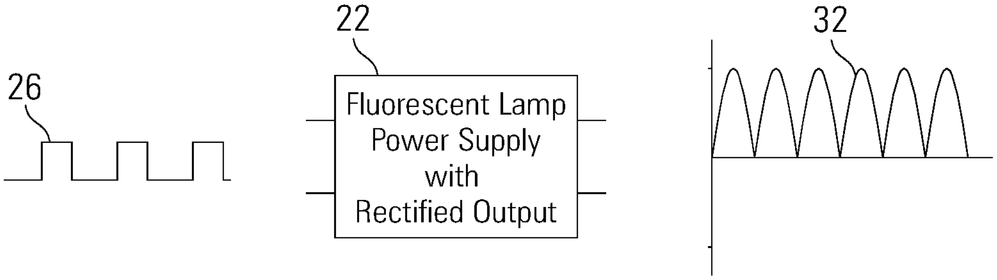

The relationship between input pulse width and output amplitude is illustrated in FIGS. 1A-1D. In FIG. 1A, a pulse train 10 with a duty cycle of about 20% is processed by a power supply 12 to form an alternating current output 14. In this embodiment, the output 14 of the power supply 12 has the same frequency as the input 10, although other embodiments may be adapted to produce an output 14 at a different frequency. In FIG. 1B, the pulse train 16 has a duty cycle of about 40%, and this doubling of the duty cycle, from 20% to 40%, while remaining under 50% doubles the amplitude of the alternating current output 20. Once the duty cycle of the pulse train exceeds 50% on-time, the output amplitude will decrease with increasing duty cycle. Although in this embodiment the output amplitude is linearly proportional to input duty cycle, other embodiments may be adapted to implement non-linear functions. The embodiments of FIGS. 1A and 1B generate full sine wave outputs. As illustrated in FIGS. 1C and 1D, a power supply 22 may have a rectified output, while maintaining the same relationship between the duty cycle of the input pulse trains 24 and 26 and the amplitude of the rectified sine wave outputs 30 and 32.

Figure 2:
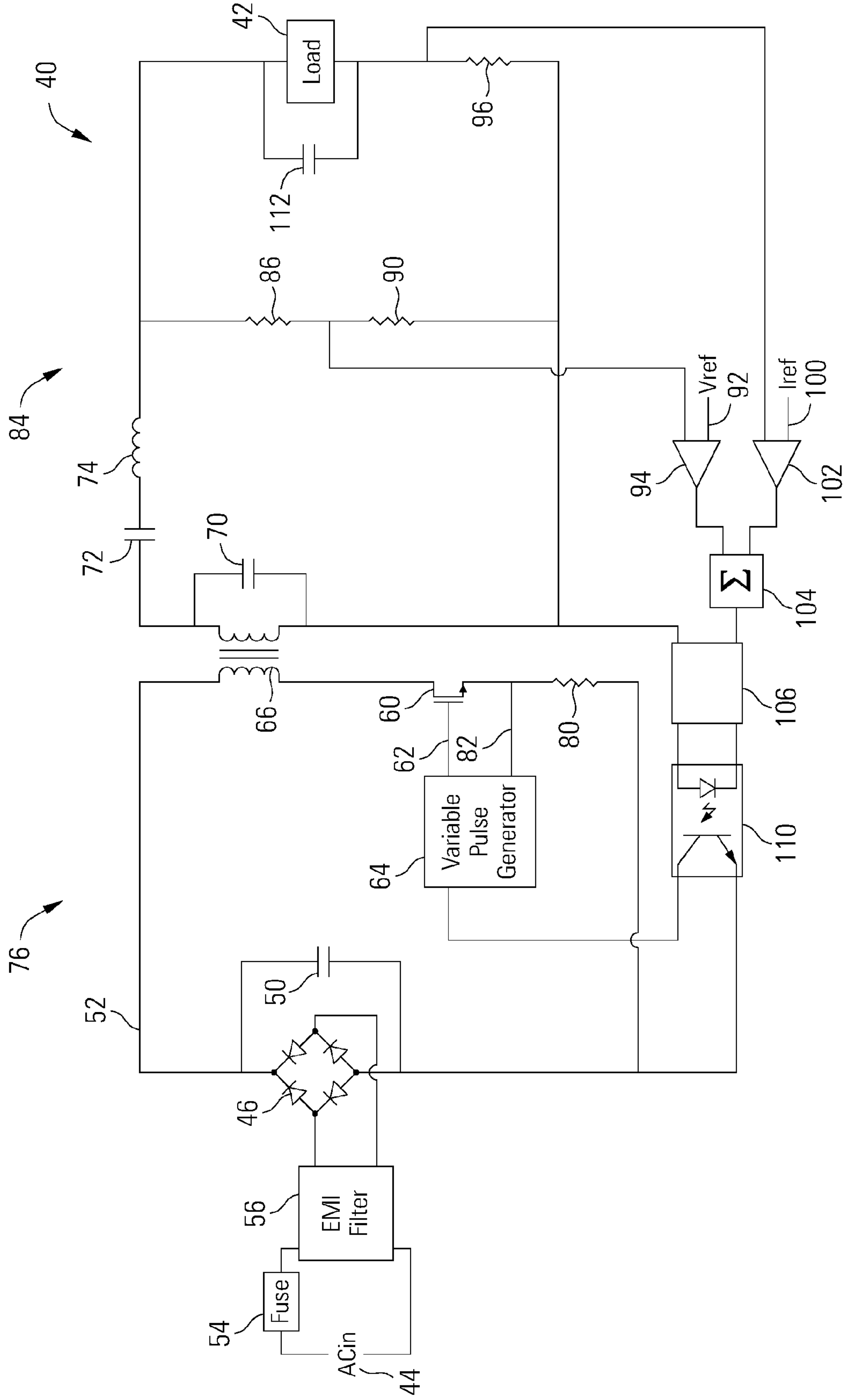
FIG. 2 depicts a block diagram of an example embodiment of a power supply that may be used for a fluorescent lamp, with isolated voltage and current feedback.

The frequency and amplitude of the alternating current output from a power supply may thus be controlled by adjusting the frequency and duty cycle of an input pulse train. An example embodiment of a power supply 40 that may be used for fluorescent lamps or other loads is illustrated in FIG. 2. In this embodiment, the power supply 40 supplies a load 42 such as a CCFL, CFL, or other type of fluorescent lamp, from an alternating current (AC) input 44. A rectifier 46 and optional capacitor 50 rectify the AC input to produce a direct current (DC) supply 52. The AC input 44 may be connected through a fuse 54 and electromagnetic interference (EMI) filter 56, if desired. The DC supply 52 is converted to a pulse train by a switch, such as an n-channel metal-oxide semiconductor (NMOS) field effect transistor (FET) 60, bipolar junction transistor (BJT), insulated gate bipolar transistor (IGBT), junction FET (JFET), unijunction transistor, or other type of transistor, to produce a pulse train. Other non-limiting examples of suitable switch devices include a bipolar transistor or field effect transistor of any type and material including but not limited to metal oxide semiconductor FET (MOSFET), junction FET (JFET), etc, and can be made of any suitable material including silicon, gallium arsenide, gallium nitride, silicon carbide, etc. The transistor 60 is rated to operate at the voltages that appear at the DC supply 52, or at the AC input 44 if no rectifier 46 is used at the input.

The transistor 60 is controlled by a pulse train at an output 62 of a variable pulse generator 64. The variable pulse generator 64 is adapted to generate a pulse train at the desired frequency for the load 42, which for a fluorescent lamp may be, for example, about 100 kHz, or any other suitable frequency including a variable frequency or a frequency with intentional dither, etc. The variable pulse generator 64 is also adapted to adjust the pulse width or duty cycle of the pulses at the variable pulse generator output 62 to provide the desired voltage and/or current amplitude to the load 42. The variable pulse generator 64 may comprise any suitable device or circuit for generating a pulse train, including using digital logic, digital, circuits, state machines, microelectronics, microcontrollers, microprocessors, field programmable gate arrays (FPGAs), complex logic devices (CLDs), analog circuits, discrete components, band gap generators, timer circuits and chips, ramp generators, half bridges, full bridges, level shifters, difference amplifiers, error amplifiers, logic circuits, comparators, operational amplifiers, flip-flops, counters, AND, NOR, NAND, OR, exclusive OR gates, etc. or various combinations of these and other types of circuits.

The pulse train is converted and/or filtered to produce a sine wave using a transformer 66 in this embodiment, also isolating the load 42 from the AC input 44. In other embodiments, the pulse train may be filtered by an inductor or any suitable filter to substantially remove at least one harmonic frequency component of the pulse train while substantially passing the fundamental frequency component of the pulse train. Any desired waveform may be generated at the output by this filtering or other processing. In this example embodiment, all harmonic frequency components are substantially removed by the transformer 66 and filtering capacitors 70 and 72 and inductor 74, of which some or all may not be needed or used, substantially passing only the fundamental frequency component, resulting in a relatively pure to pure sine wave to the load 42. Filtering capacitors 70 and 72 and inductor 74 are merely examples and may be omitted, placed in other locations in the power supply 40, or replaced with other types of filters as desired.

The variable pulse generator 64 may be adapted to control the pulse width, frequency, and/or other characteristics based on one or more feedback signals representing various aspects of the power supply 40. For example, the variable pulse generator 64 may be adapted to limit inrush current through the transformer 66 or to protect against over-current situations on the input or primary side 76 of the power supply 40, based for example on a current measurement in the primary side 76 by an input current detector. In one embodiment, an input current sensing resistor 80 is placed at any suitable location in the primary side 76, and the current through the input current sensing resistor 80 is measured for example by an input current feedback signal 82. The variable pulse generator 64 interprets the voltage level on the input current feedback signal 82 as an indication of the current through the input current sensing resistor 80. If the current through the input current sensing resistor 80 reaches a threshold level, the variable pulse generator 64 is adapted to reduce the pulse width as established by the on-time of the transistor 60, or even to turn off the transistor 60 altogether. The power supply 40 is not limited to any particular method of measuring the input current in the primary side 76. Furthermore, the input current may be limited or turned off in other ways, rather than or in addition to using the variable pulse generator 64 to reduce pulse width.

The variable pulse generator 64 may also be adapted to control the load current in the secondary side 84 of the power supply 40. In some embodiments, load current may be controlled based in part on the voltage across the load 42, measured for example by a load voltage detector comprising a voltage divider made of resistors 86 and 90, capacitors, or using another voltage sensor. Resistors 86 and 90 are rated to withstand the voltage across the load 42 and have a relatively high resistance to minimize their impact on the load current. The load voltage may be compared with a reference voltage signal 92 in a comparator or operational amplifier (op-amp) 94 or any other suitable device, or may be fed directly into the variable pulse generator 64 for analysis before adjusting the pulse width at the transistor 60. Load current may also be used by the variable pulse generator 64 when controlling the pulse width at the transistor 60. In some embodiments, load current is measured using a load current detector or load current sensing resistor 96 placed in series with the load 42, using a relatively low value resistor to minimize impact on load current. As with the load voltage detection, the load current may be compared with a reference current signal 100 in an op-amp 102 or other device. Feedback signals may be combined if desired outside of the variable pulse generator 64 in an OR gate, a summer, or any other type of digital, analog or digital and analog combining circuit 104. The feedback signals may be further processed as desired in a feedback signal processing circuit 106, or may be passed directly on toward the variable pulse generator 64. The feedback signal or signals may be isolated and/or level shifted, if desired, using an optocoupler 110, optoisolator, transistor, transformer, or other device. The variable pulse generator 64 may be adapted to begin controlling the pulse width in the pulse train at the transistor 60 when the load voltage and/or load current reaches a threshold level.

Note that the terms "primary side" and "secondary side" are applicable not only to embodiments using a transformer 66 to convert a pulse train to a sine wave or other waveform, in which the term "primary side" refers to the circuit on the primary winding of the transformer 66 and the term "secondary side" refers to the circuit on the secondary winding of the transformer 66 but also in embodiments using an inductor, filter or other devices. In these embodiments, the term "primary side" refers to the pulse train side of the power supply and the term "secondary side" refers to the filtered sine wave side of the power supply.

It is also important to note that features shown in the drawings may be combined in various different ways, including combining features illustrated in different figures. Furthermore, additional embodiments of the invention may be formed by selectively omitting features shown in the drawings. For example, embodiments of the invention may include or omit various filtering components, primary side current feedback, secondary side voltage feedback, secondary side current feedback, etc, to form a wide number of different embodiments based on the requirements for the power supply 40. The combinations of features illustrated in the drawings are merely examples and have been selected in part to limit the number of drawings for clarity by including a wide range of elements that may or may not be included in any particular embodiment. Additional components may also be included as required by the load 42 or to fulfill other requirements of the power supply 40, such as a bypass capacitor or ballast capacitor 112 that may be connected in parallel with some types of fluorescent lamps. Furthermore, circuitry may be added to power elements of the power supply 40 internally from the DC supply 52 or from other sources, for example to power the variable pulse generator 64, optocoupler 110, feedback signal processing circuit 106, op-amps 94 and 102, etc., and some examples of internal power circuits will be illustrated and described in figures below. Variable frequency, variable on time, variable off time, etc. may be employed in the present invention. The circuit could consist, but is not limited to, of one or more of the following: boost, buck, boost-buck, buck-boost, SEPIC, Cuk, etc. Discontinuous conduction mode, continuous conduction mode, critical conduction mode, resonant conduction mode, etc. can be used to implement the present invention.

Figure 3:
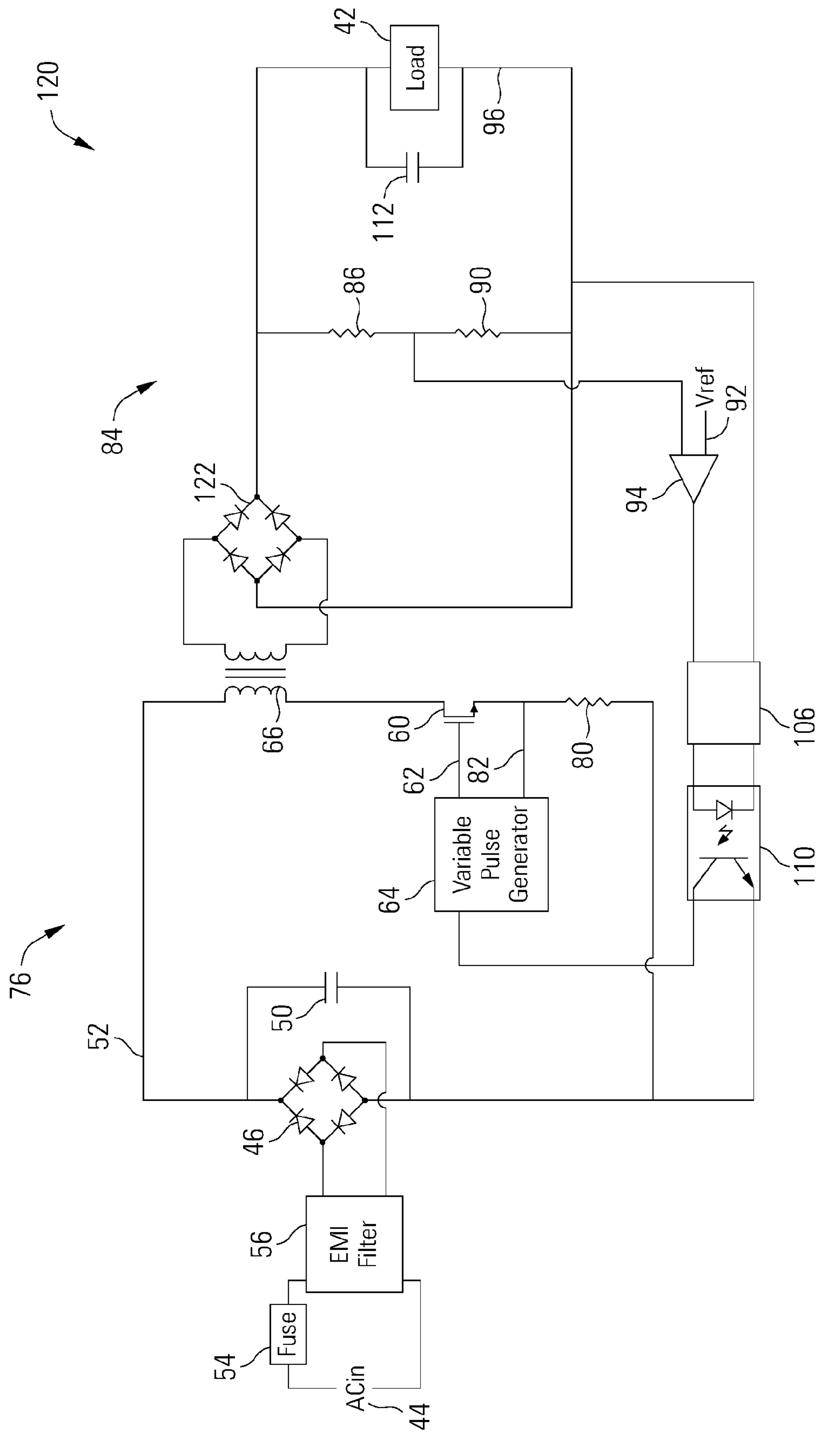
FIG. 3 depicts a block diagram of an example embodiment of a power supply that may be used for a fluorescent lamp, with rectified load current and isolated voltage feedback.

Referring now to FIG. 3, another embodiment of a power supply 120 has a rectified output as illustrated in FIGS. 1C and 1D. In this embodiment, a diode bridge or other rectifier 122 inverts negative portions of the sine wave (or other waveform) from the transformer 66, producing a series of half sine wave pulses to the load 42. Note that the power supply 120 may be applied to loads in any suitable manner. For example, fluorescent lamps may be negatively impacted by power supplied with a DC offset which could force mercury to collect at one end of the lamp. In such a case, the fluorescent lamp could be driven by two power supplies 120 from opposite ends of the lamp, with suitable phase and/or polarity differences to power the lamp. In other embodiments, a DC bias may be applied to the output of the rectifier 122 to counteract the DC offset of the rectified sine wave. In one particular embodiment, no rectification of the waveform across the CFL, CCFL, FL, etc. is performed which results in an AC output waveform. Any of the above and other methods can be used to produce a zero DC or appropriate waveform for a particular application or need.

Figure 4:
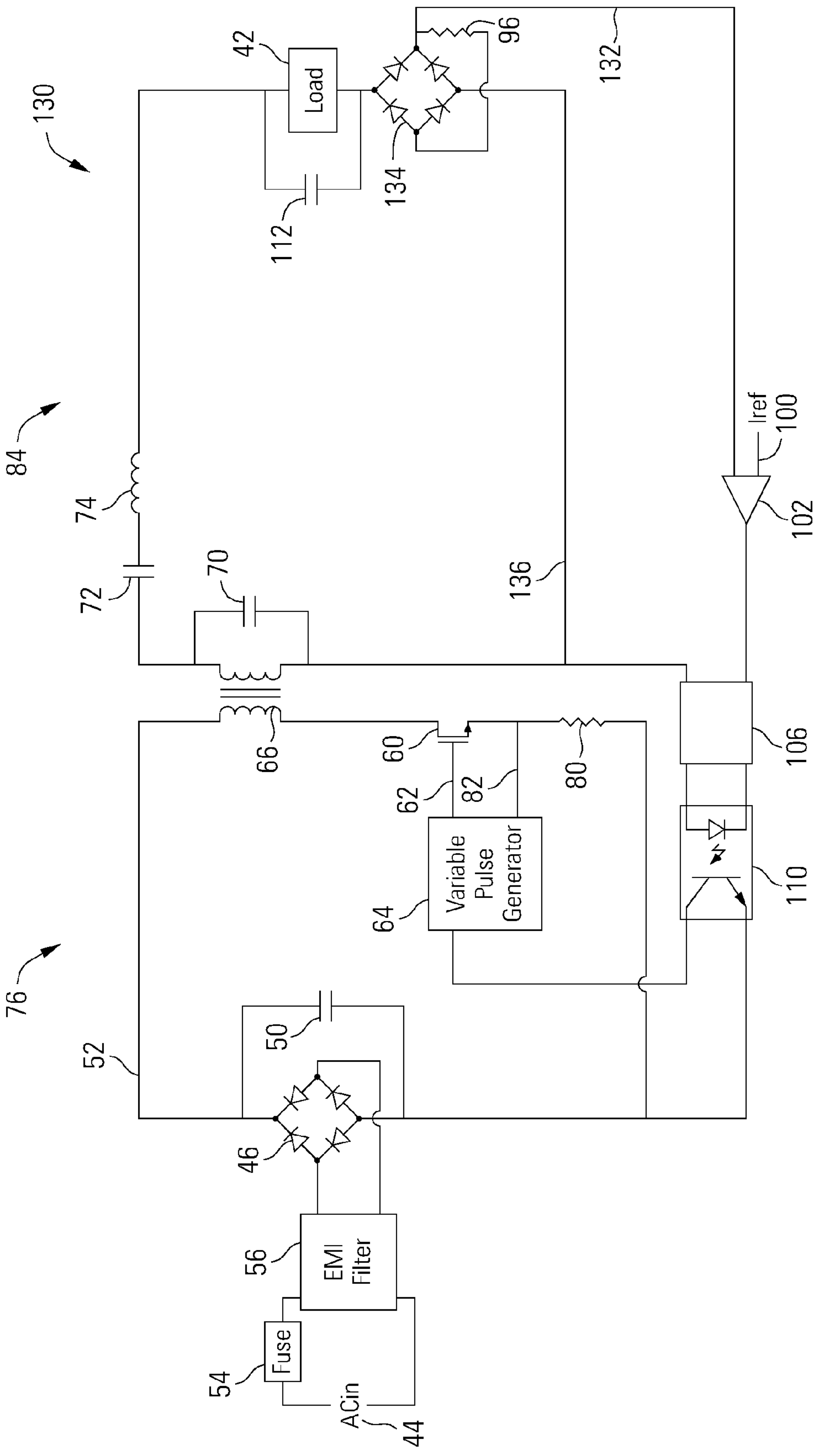
FIG. 4 depicts a block diagram of an example embodiment of a power supply that may be used for a fluorescent lamp, with filtered load current and fully rectified current feedback.

As illustrated in FIG. 4, another embodiment of a power supply 130 provides a non-rectified sine wave or other desired waveform to the load 42, while rectifying the load current feedback signal 132 using a rectifier 134 below or after the load 42. In this embodiment, the load current sensing resistor 96 is connected between the positive DC node at the common cathode point of a diode bridge rectifier 134 and the DC ground node at the common anode point of a diode bridge rectifier 134. The load current feedback signal 132 is placed to convey the voltage drop across the load current sensing resistor 96, such as at the positive DC node at the common cathode point of a diode bridge rectifier 134. The load current feedback signal 132 may be referenced to the AC return line 136 on the secondary side 84 as illustrated in FIG. 4, or to the DC ground node at the common anode point of the diode bridge rectifier 134, or to other reference points as desired. This embodiment leaves the load current in an optimal unrectified state for fluorescent lamps, while providing a rectified feedback signal. Note that voltage feedback signals may be similarly rectified if desired. Rectified feedback signals may further be filtered to provide DC feedback signals or time or frequency averaged signals. The above is only meant to suggest some example exemplary embodiments of the present invention. Any combination of the above or of circuits and approaches not described here may be used to realize the present invention.

Figure 5:
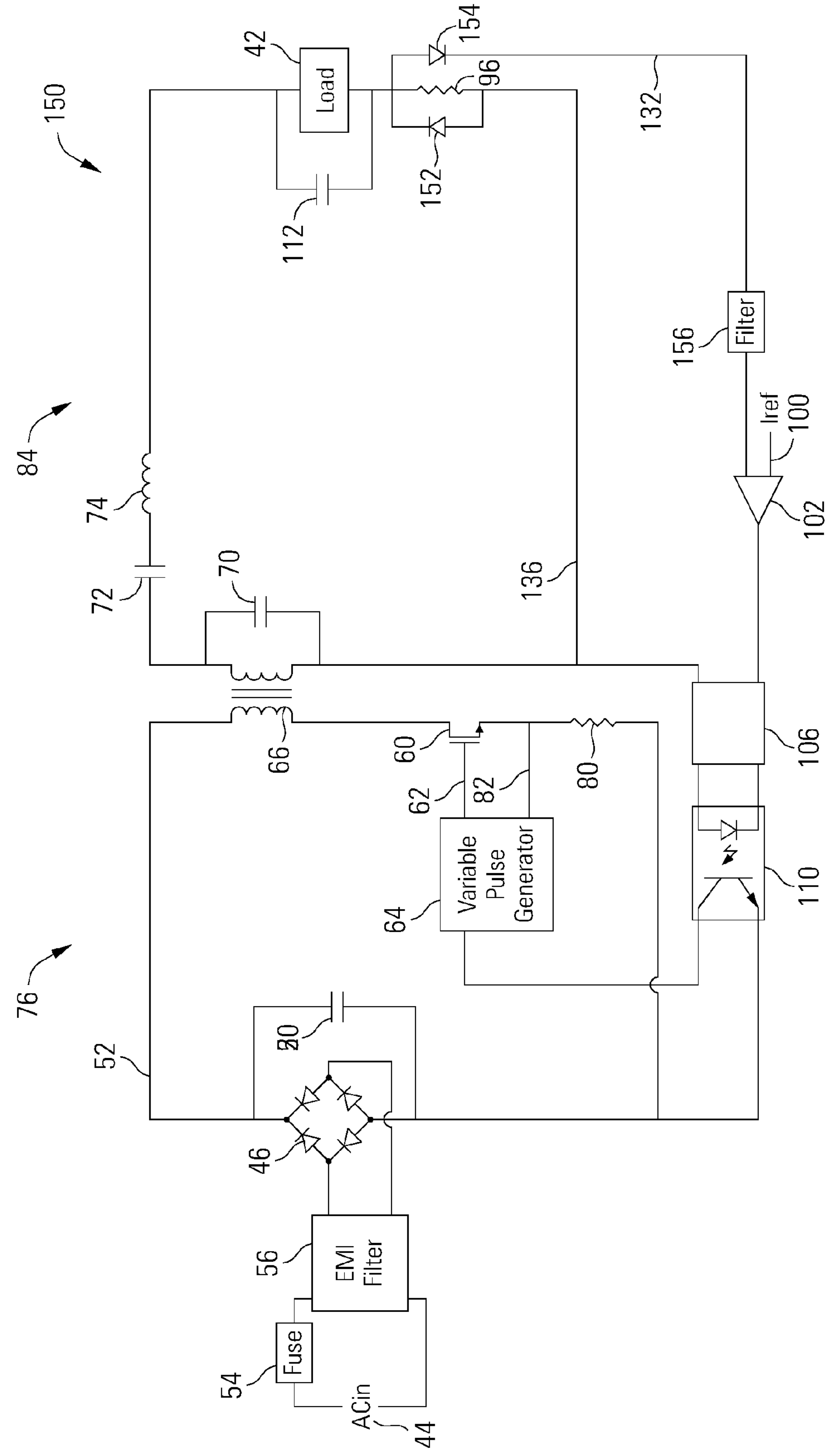
FIG. 5 depicts a block diagram of an example embodiment of a power supply that may be used for a fluorescent lamp, with filtered load current and partially rectified current feedback.

As illustrated in FIG. 5, feedback signals in other embodiments may be partially rectified rather than fully rectified, reducing size, cost and complexity of a power supply 150. For example, a diode 152 may be connected in parallel with the load current sensing resistor 96, with another diode 154 connected in opposite polarity to the top of the load current sensing resistor 96 as shown in FIG. 5. Time constants may be added as desired to feedback signals in various locations in the power supply 150, and feedback signals may be filtered if desired, such as in a filter 156 in the load current feedback signal 132. In still other embodiments, the feedback circuitry may be further simplified by omitting the diode 154 in the load current feedback signal 132. In another example embodiment illustrated in FIG. 6, the diode 154 is placed in series with the load current sensing resistor 96 rather than in parallel with the load current sensing resistor 96 in the load current feedback signal 132.

Figure 6:
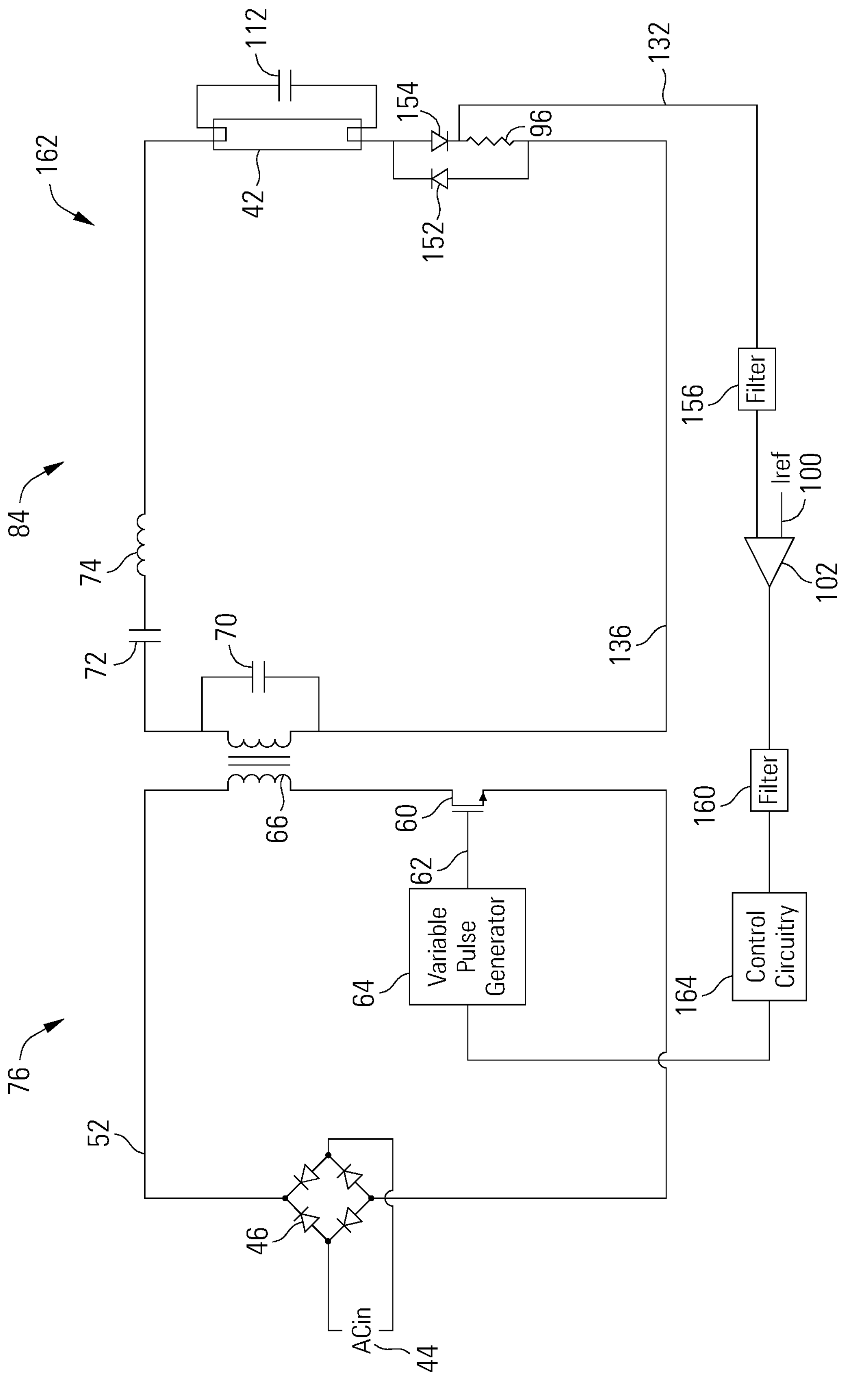
FIG. 6 depicts a block diagram of an example embodiment of a power supply that may be used for a fluorescent lamp, with filtered load current and partially rectified current feedback.

Filters 156 and 160 may be placed in the power supply 162 as desired, for example to control the pulse width based on average voltage and/or current values rather than instantaneous values. Combinations of average and instantaneous feedback values may also be used. In the embodiment illustrated in FIG. 6, the load 42 is a CFL with a cathode heater, although the power supply 162 is not limited to use with any particular type of load. The primary side 76 and secondary side 84 may be isolated by the transformer 66 and an optocoupler 110, allowing them to float independently, or may be coupled through the feedback signals as illustrated in FIG. 6. Control circuitry 164 may also be added to process the load current feedback signal 132 and control the variable pulse generator 64. For example, the variable pulse generator 64 may comprise a simple gate pulse driver and the control circuitry 164 may comprise a timer or oscillator, comparator, etc, with internal isolation as needed for protection.

Figure 7:
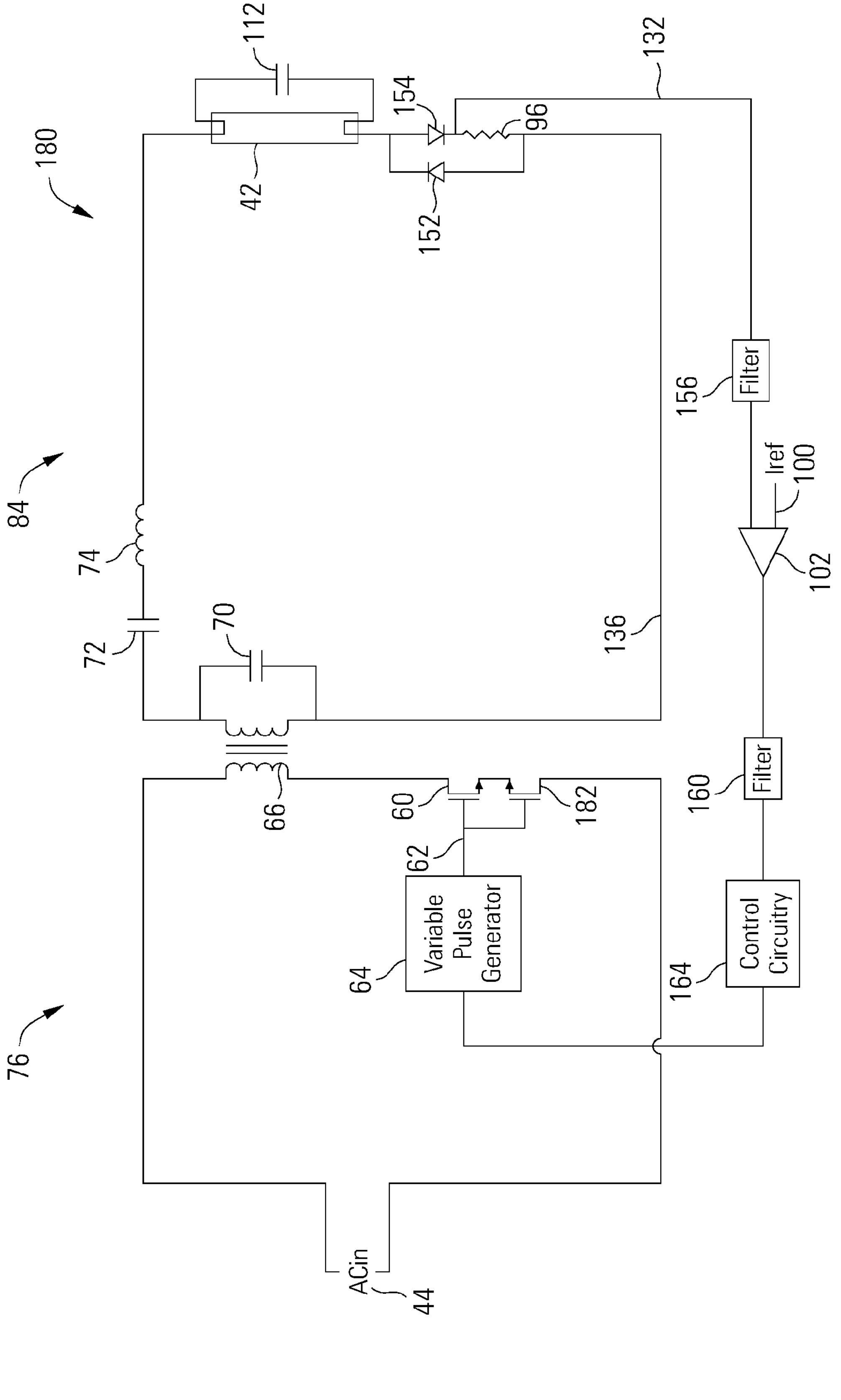
FIG. 7 depicts a block diagram of an example embodiment of a power supply that may be used for a fluorescent lamp, with unrectified AC input.

Turning now to FIG. 7, another embodiment of the power supply 180 omits the rectifier 46 on the primary side 76, including back to back source-connected transistors 60 and 182, both controlled in concert by the variable pulse generator 64. In this embodiment, when the pulse train runs at a relatively high frequency such as on the order of 100 kHz for fluorescent lamp applications, the pulse train comprises a series of substantially square or rectangular pulses that follows the envelope of the input AC waveform, such as a 50 Hz or 60 Hz AC sine wave. When the AC input 44 is positive and the transistors 60 and 182 are both switched on by the variable pulse generator 64, current flows through the channel of the transistor 60 and through the parasitic diode of the transistor 182. When the AC input 44 is negative and the transistors 60 and 182 are both switched on by the variable pulse generator 64, current flows through the channel of the transistor 182 and through the parasitic diode of the transistor 60.

Figure 8:
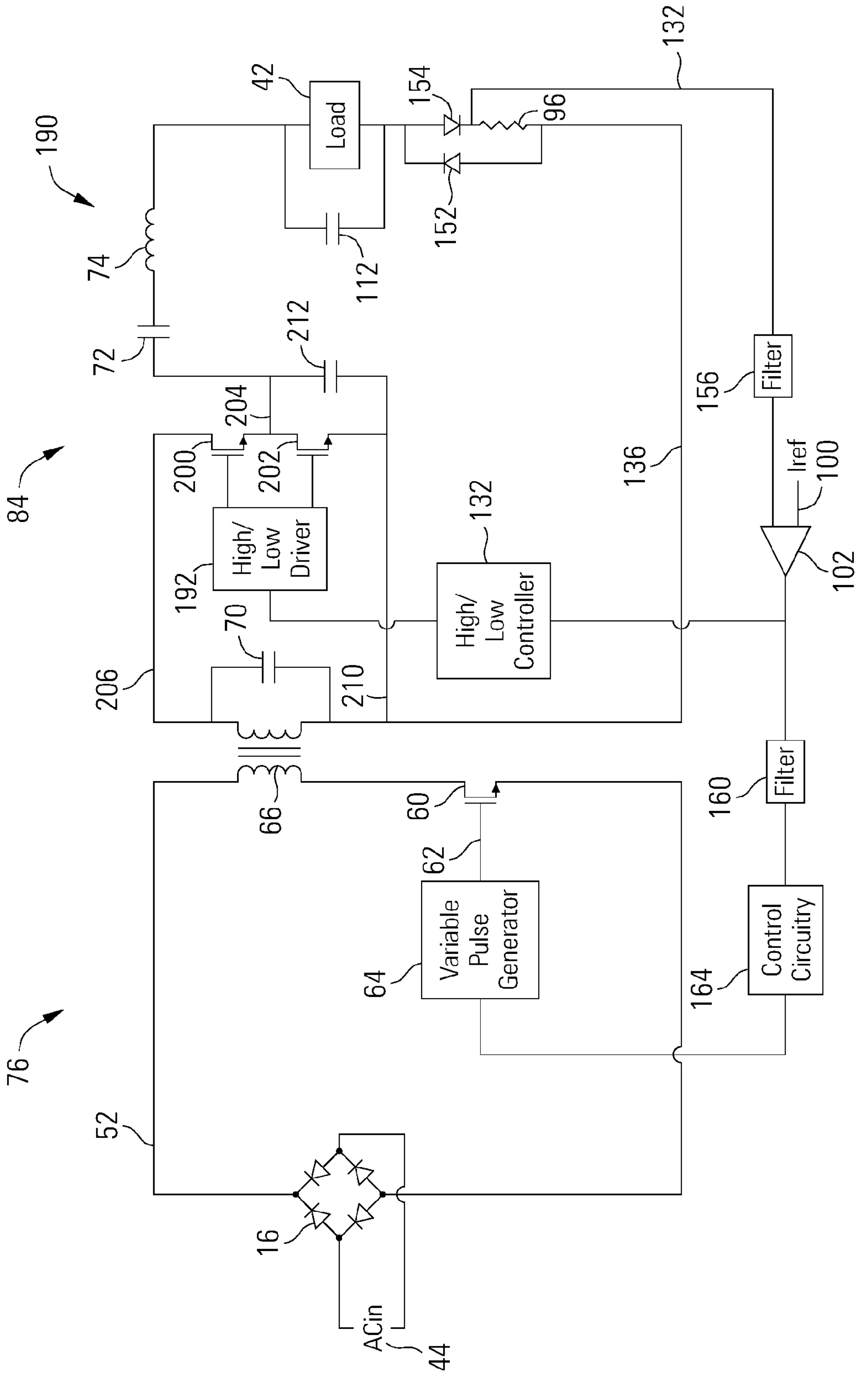
FIG. 8 depicts a block diagram of an example embodiment of a power supply that may be used for a fluorescent lamp, with a high/low driver controlling high frequency alternating current to the load.

Turning now to FIG. 8, in another embodiment the variable pulse generator 64 may be used to control the power factor of the power supply 190 on the primary side 76 while a high/low driver 192 and high/low controller 194 are used on the secondary side 84 to control load voltage and/or current. The high/low driver 192 drives, for example, a pair of NFET transistors 200 and 202 (or any other suitable types of transistors, switches or alternative circuitry), to alternately connect an unfiltered output node 204 to the output 206 of the transformer 66 and to the return line 210 of the transformer secondary 66. (In embodiments with an inductor or other filter in place of the transformer 66, the unfiltered output node 204 would be alternately connected to the output and ground lines from the filter.) In this embodiment, the variable pulse generator 64 and high/low driver 192 may be operated at or near the same frequency, or at very different frequencies and may also be used for dimming. The high/low driver 192 samples the sine wave output from the output 206 of the transformer 66. Filtering capacitors 212, 72 and inductors (e.g., 74) may be used to smooth the sampled sine wave to provide a waveform suitable for the load 42.

Figure 9:
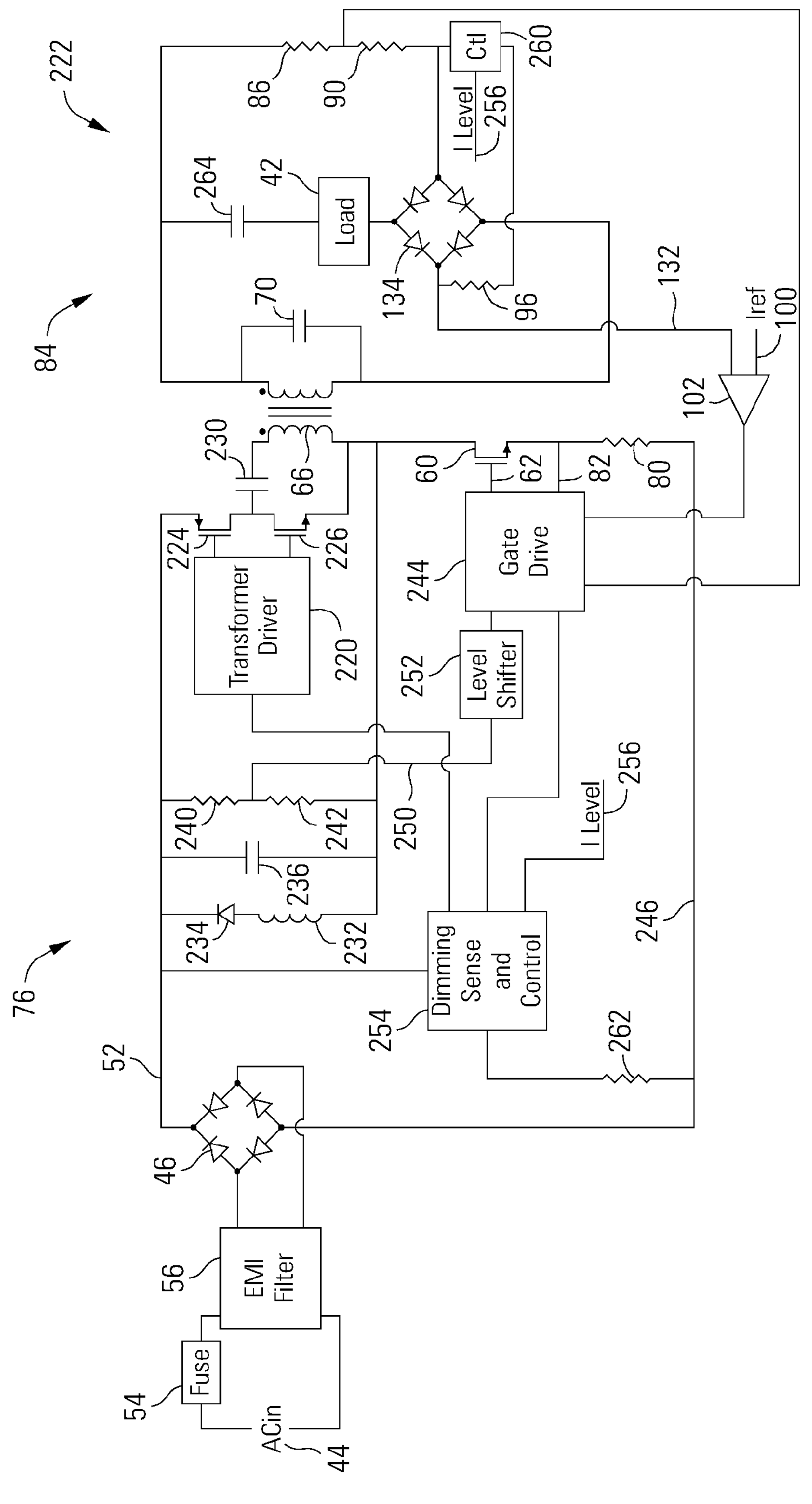
FIG. 9 depicts a block diagram of an example embodiment of a power supply that may be used for a fluorescent lamp, with a primary side dimming controller, transformer driver and direct load current control.

Turning to FIG. 9, a transformer driver 220 may be used, for example, in a power supply 222 to drive a pair of transistors 222 and 224 to control the current through the transformer 66 in a push-pull configuration using, for example, a non-center tapped transformer or a center tapped transformer. A center tapped transformer may be used on the primary or secondary side or both sides. A capacitor 230 may be connected in series with the transformer 66. The transformer 66 may also be connected in a center tap configuration. The transformer driver 220 may be powered from the DC supply 52 by a series inductor 232 and diode 234 connected in parallel with the transformer driver 220 and with a capacitor 236. The voltage across the transformer driver 220 may be measured by voltage divider resistors 240 and 242 and provided as feedback to a gate drive circuit 244 to limit or turn off the current through the transformer 66 in the event of an over-voltage condition. The gate drive circuit 244 may also be provided with feedback from the secondary side 84, such as with the load current and voltage feedback illustrated in FIG. 9, either with or without reference level comparisons. In this embodiment, the pulse train may be generated by the transformer driver 220, with the variable pulse generator 64 being replaced by a gate drive circuit 244 to turn off the current through the transformer driver 220 in the event of over-voltage or over-current conditions at various locations in the power supply 222. With, for example, the transformer driver 220 referenced to the DC supply 52 and the gate drive circuit 244 referenced to the primary side ground 246, the transformer driver voltage feedback signal 250 may be passed through any suitable level shifter 252 if needed.

A dimming sense and control circuit 254 may be used to internally dim the power supply 222 based on an external control signal, whether obtained in a wired or wireless manner, or based on voltage and/or current levels at the DC supply 52, or based on duty cycle, waveform, phase information, etc. of the DC supply 52 or of the AC input 44. The dimming sense and control circuit 254 may provide a pulse width modulated (PWM) output signal or other type of output signal, using any suitable circuitry such as, for example, digital logic, digital, circuits, state machines, microelectronics, microcontrollers, microprocessors, field programmable gate arrays (FPGAs), complex logic devices (CLDs), analog circuits, discrete components, band gap generators, timer circuits and chips, ramp generators, half bridges, full bridges, level shifters, difference amplifiers, error amplifiers, logic circuits, comparators, operational amplifiers, flip-flops, counters, AND, NOR, NAND, OR, exclusive OR gates, etc. or various combinations of these and other types of circuits. The dimming sense and control circuit 254 may reduce the current to the load 42 in one or more of a number of manners, including controlling the transformer driver 220 and/or the gate drive circuit 244 to reduce current through the transformer 66, or by providing a current level control signal 256 used to directly modify the load current by a load current controller 260 on the secondary side 84. Note that the current level control signal 256 may be directly connected, or may be isolated, level shifted, and/or filtered as desired or needed between the dimming sense and control circuit 254 and load current controller 260. The load current controller 260 may comprise any device or circuit capable of adjusting or limiting the load current, such as a current mirror or variable impedance, etc. In some embodiments, the dimming may be based in part on current and/or voltage measurements from devices such as sense resistors (e.g., 262). Additional components may be added as needed, such as a DC-blocking or filtering capacitor 264 connected in series with the load 42.

Figure 10:
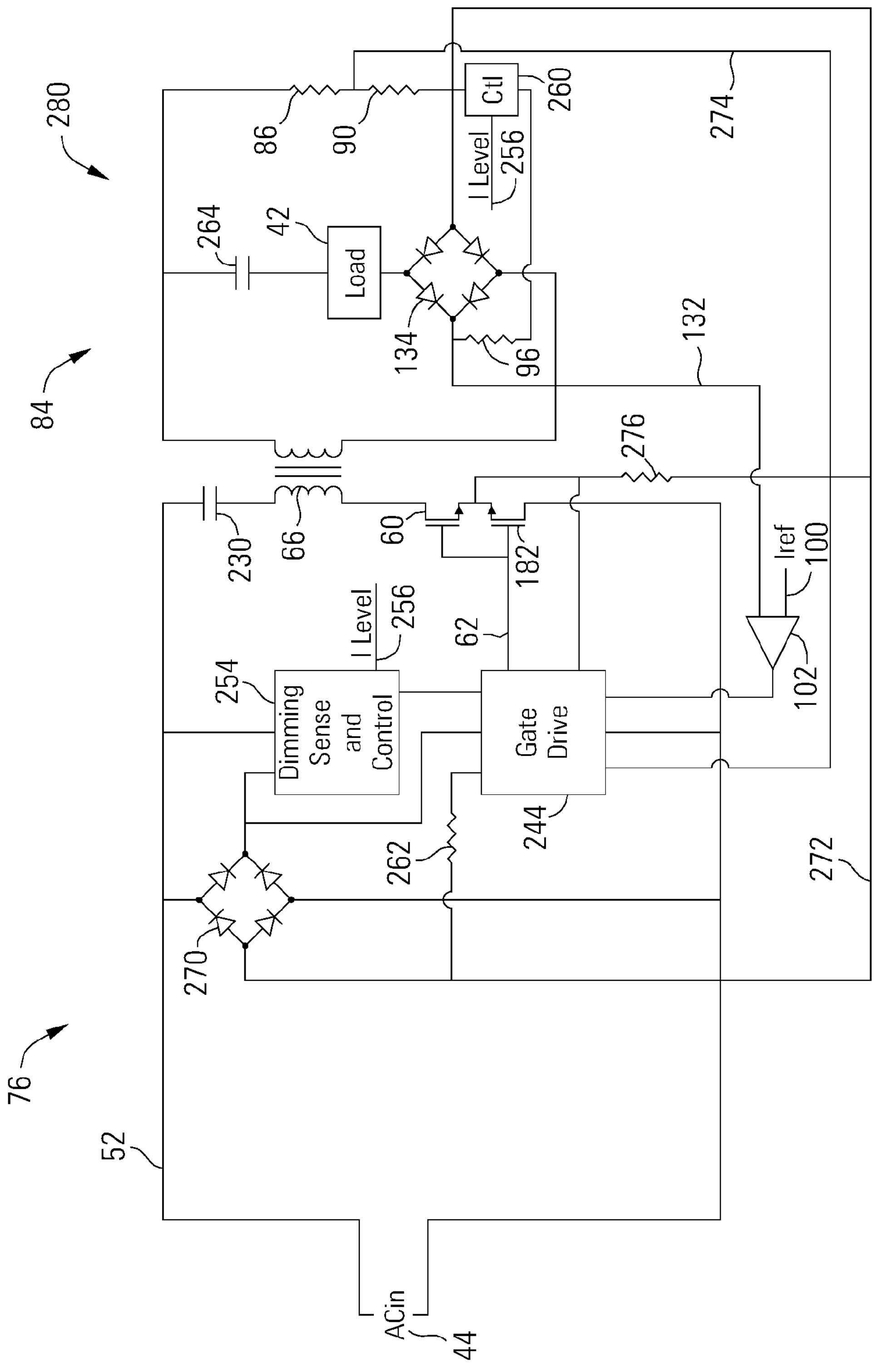
FIG. 10 depicts a block diagram of an example embodiment of a power supply that may be used for a fluorescent lamp, with unrectified AC input, a primary side dimming controller and direct load current control.

In an embodiment illustrated in FIG. 10, the unrectified AC signal from the AC input 44 is passed through the transformer 66 as in the previously described embodiment of FIG. 7. In this embodiment, a dimming sense and control circuit 254 is included, powered by a rectifier 270. A DC ground 272 is connected between the primary side 76 and secondary side 84, although in other embodiments the DC grounds from the primary and secondary side rectifiers 270 and 134 are left separate to allow them to float independently. Again, various elements of the example embodiments disclosed herein may be selectively combined in any of a number of ways, such as including voltage and current feedback from the secondary side 84 to the gate drive circuit 244, isolating or not isolating feedback signals and grounds, comparing voltage and current levels to threshold values as with the load current feedback signal 132 in FIG. 10 or not as with the load voltage feedback signal 274. Feedback signals may be combined outside of the gate drive circuit 244 or supplied independently to the gate drive circuit 244 and used in a variety of ways in the gate drive circuit 244, for example giving priority to particular feedback signals, etc. The voltage level at the common source node of the transistors 60 and 182 may be provided as feedback to the gate drive circuit 244, with the voltage level referenced to the DC ground 272 through resistor 276 or not, as desired. The size and cost can thus be balanced against the desired features and operating characteristics of the power supply 280.

Figure 11:
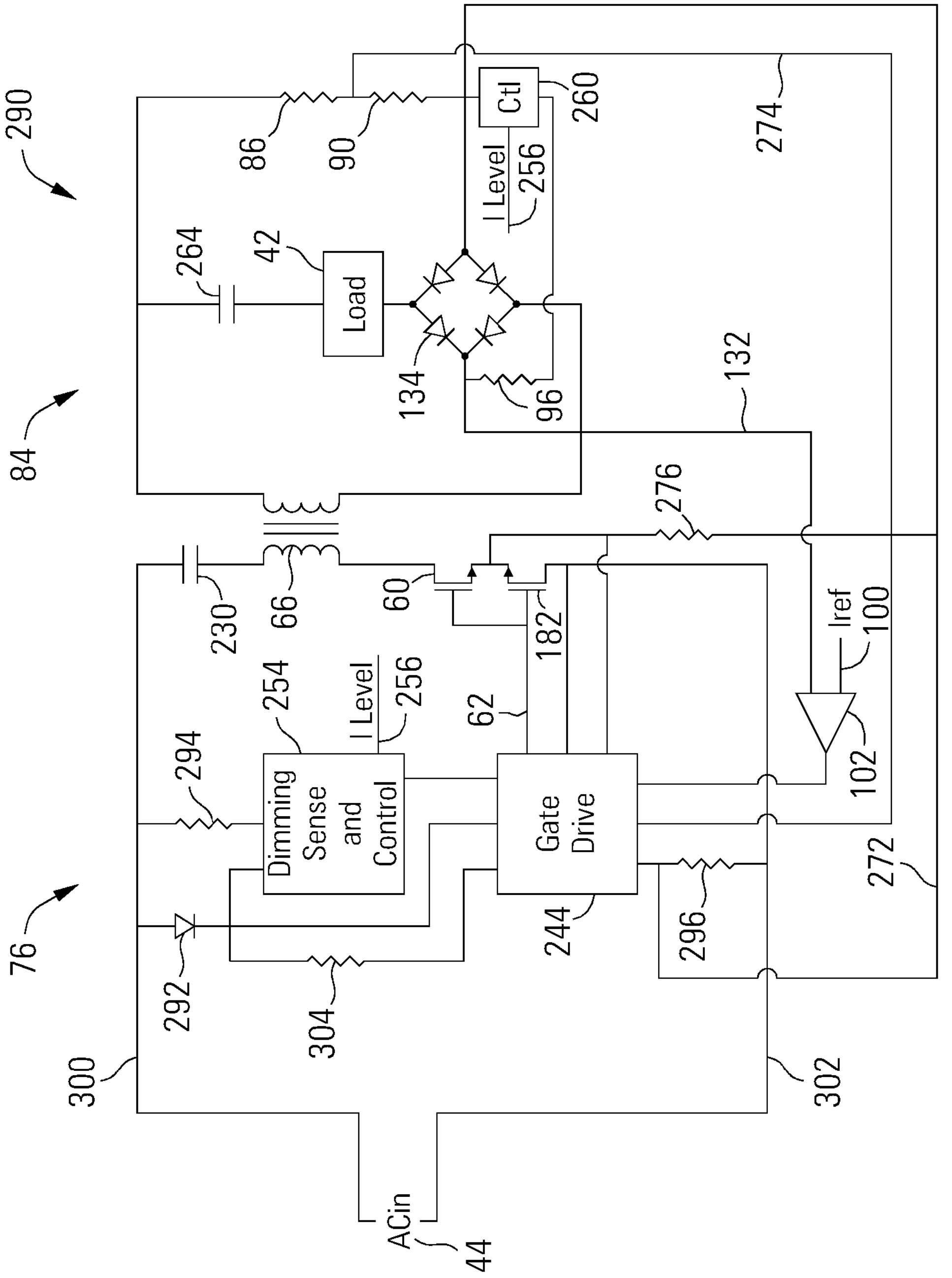
FIG. 11 depicts a block diagram of an example embodiment of a power supply that may be used for a fluorescent lamp, with unrectified AC input, a primary side dimming controller and direct load current control, and a single diode powering primary side controllers.

Turning now to FIG. 11, in another embodiment of the power supply 290 the power circuitry supplying the dimming sense and control circuit 254 and the gate drive circuit 244 from the AC input 44 is simplified from the rectifier 270 to a single diode 292. One or more diodes may be used for this particular example embodiment where, for example, the number of diodes can typically be from 1 to N, where N may typically equal 1, 2, 3, 4 or a number larger than 4. Depending on the specific circuitry used in the dimming sense and control circuit 254 and gate drive circuit 244, they may require more regulated power or may be able to run with partially rectified and unfiltered power from the AC input 44. In this embodiment, the dimming sense and control circuit 254 and gate drive circuit 244 are allowed to float within the AC power from the AC input 44, by enclosing them within resistors 294 and 296. By selecting values for the resistors 294 and 296, the dimming sense and control circuit 254 and gate drive circuit 244 can be caused to float closer to either the upper rail 300 or lower rail 302. Sense resistors (e.g., 304) may be included and placed in various locations based upon the control scheme to be implemented by the dimming sense and control circuit 254 and gate drive circuit 244.

Figure 12:
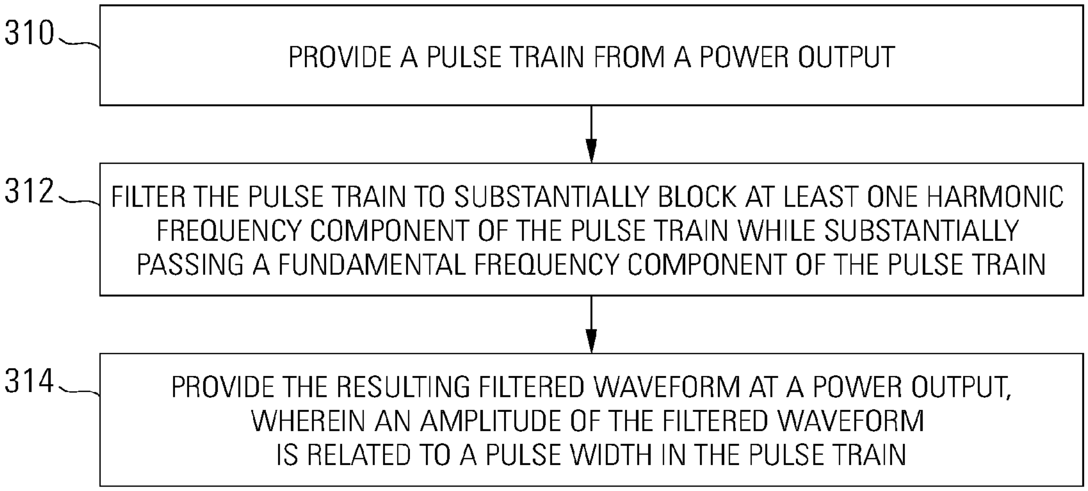
FIG. 12 depicts and example method of powering a fluorescent lamp.

An example of a method for supplying power to a fluorescent lamp or other load is illustrated in the flowchart of FIG. 12. Based on a power input, whether unrectified AC, rectified AC, DC, or any other power input, a pulse train is provided. (Block 310) The pulse train is filtered to substantially block at least one harmonic frequency component of the pulse train while substantially passing a fundamental frequency component of the pulse train. (Block 312) The power supply is not limited to producing any particular type of output waveform, but in an embodiment for powering a fluorescent lamp, the output waveform is a pure or substantially pure sine wave with substantially no DC offset. The resulting filtered waveform is then provided at a power output, wherein an amplitude of the filtered waveform is related to the pulse width in the pulse train. (Block 314) As discussed above, the power to the load may be dimmed under the control of an external dimmer or by a control signal provided to an internal dimming sense and control circuit. The dimming may be accomplished by varying the width or duty cycle of the pulses in the pulse train, or by directly controlling the load current using a current mirror, variable impedance or any other suitable method, etc. The width or duty cycle of the pulses in the pulse train may be controlled during dimming and/or during over-current or over-voltage conditions using one or more feedback signals to a variable pulse generator (e.g., 64), transformer driver (e.g., 220), gate drive circuit (e.g., 244), high-low side driver, push-pull, center tapped transformer, etc.

The power supply disclosed herein in its various embodiments provides a dimmable, controllable, relatively simple and inexpensive circuit and device for powering loads such as fluorescent lights, and for dimming those loads, while controlling and providing an excellent power factor.

While illustrative embodiments have been described in detail herein, it is to be understood that the concepts disclosed herein may be otherwise variously embodied and employed.

What is claimed is:

1. A power supply, comprising:
a power input;
a pulse generator connected to the power input, the pulse generator having a variable pulse width output;
a filter connected to the variable pulse width output and to the power input, wherein the filter is adapted to substantially block at least one harmonic frequency component of the variable pulse width output and to substantially pass a fundamental frequency component of the variable pulse width output;
a power output connected to the filter, wherein an amplitude at the power output is related to pulse width at the variable pulse width output;
a dimming sense and control circuit connected to the pulse generator, wherein the dimming sense and control circuit is adapted to controllably alter the pulse width at the variable pulse width output; and
a load current controller connected to the dimming sense and control circuit and to the power output.

2. The power supply of claim 1, wherein the power supply is adapted to increase a power factor by controlling the pulse generator.

3. The power supply of claim 1, wherein the filter comprises a transformer connected between the power input and the power output.

4. The power supply of claim 1, further comprising a load current detector connected to the power output, and a load current feedback signal from the load current detector to the variable pulse generator.

5. The power supply of claim 4, further comprising a reference current signal and a comparator connected to the load current feedback signal and the reference current signal.

6. The power supply of claim 5, further comprising an isolator connected in series with the load current feedback signal.

7. The power supply of claim 4, further comprising a rectifier connected between the power output and the load current detector.

8. The power supply of claim 4, further comprising a partial rectifier connected between the power output and the load current detector.

9. The power supply of claim 1, further comprising a load voltage detector connected to the power output, and a load voltage feedback signal from the load voltage detector to the variable pulse generator.

10. The power supply of claim 1, further comprising a rectifier connected between the power input and the filter.

11. The power supply of claim 1, further comprising an input current detector connected in series with the filter.

12. The power supply of claim 11, further comprising an input voltage detector connected to the power input.

13. The power supply of claim 1, wherein the filter comprises a transformer, wherein the pulse generator comprises a transformer driver connected to the transformer.

14. The power supply of claim 1, wherein the power input to the pulse generator comprises an unrectified alternating current supply, and wherein the pulse generator comprises a pair of transistors controlled by a gate drive circuit.

15. A power supply, comprising:
a power input;
a pulse generator connected to the power input, the pulse generator having a variable pulse width output, the pulse generator comprising a push-pull transformer driver;
a transformer connected to the variable pulse width output and to the power input, wherein the transformer is adapted to substantially block at least one harmonic frequency component of the variable pulse width output and to substantially pass a fundamental frequency component of the variable pulse width output;
a power output connected to the transformer, wherein an amplitude at the power output is related to pulse width at the variable pulse width output; and
a rectifier connected between the power output and the load current detector.

16. The power supply of claim 15, further comprising a load current detector connected to the power output, and a load current feedback signal from the load current detector to the variable pulse generator.

17. The power supply of claim 16, further comprising a reference current signal and a comparator connected to the load current feedback signal and the reference current signal.

18. The power supply of claim 17, further comprising an isolator connected in series with the load current feedback signal.

19. A power supply, comprising:
a power input;
a pulse generator connected to the power input, the pulse generator having a variable pulse width output, the pulse generator comprising a push-pull transformer driver;
a transformer connected to the variable pulse width output and to the power input, wherein the transformer is adapted to substantially block at least one harmonic frequency component of the variable pulse width output and to substantially pass a fundamental frequency component of the variable pulse width output;
a power output connected to the transformer, wherein an amplitude at the power output is related to pulse width at the variable pulse width output; and
a partial rectifier connected between the power output and the load current detector.

* * * * *